US012355786B2

(12) United States Patent
Karpovsky et al.

(10) Patent No.: US 12,355,786 B2
(45) Date of Patent: Jul. 8, 2025

(54) MACHINE LEARNING APPROACH FOR SOLVING THE COLD START PROBLEM IN STATEFUL MODELS

(71) Applicant: MICROSOFT TECHNOLOGY LICENSING, LLC, Redmond, WA (US)

(72) Inventors: Andrey Karpovsky, Kiryat Motzkin (IL); Idan Hen, Tel-Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 215 days.

(21) Appl. No.: 17/806,889

(22) Filed: Jun. 14, 2022

(65) Prior Publication Data

US 2023/0403289 A1 Dec. 14, 2023

(51) Int. Cl.
*H04L 9/40* (2022.01)
*G06N 20/20* (2019.01)
*H04L 41/16* (2022.01)

(52) U.S. Cl.
CPC ......... *H04L 63/1425* (2013.01); *G06N 20/20* (2019.01); *H04L 41/16* (2013.01)

(58) Field of Classification Search
None
See application file for complete search history.

(56) References Cited

U.S. PATENT DOCUMENTS

| 10,453,444 B2 * | 10/2019 | Zitouni | G06N 20/00 |
| 2007/0192863 A1 * | 8/2007 | Kapoor | H04L 67/10 726/23 |
| 2008/0263661 A1 * | 10/2008 | Bouzida | H04L 63/1416 726/22 |
| 2016/0379132 A1 * | 12/2016 | Jin | H04L 67/535 706/12 |
| 2017/0104773 A1 | 4/2017 | Flacher et al. | |
| 2017/0330056 A1 * | 11/2017 | Merhav | G06F 18/24 |
| 2018/0144126 A1 * | 5/2018 | Swinke | G06F 21/316 |

(Continued)

OTHER PUBLICATIONS

"Cold start (recommender systems)", Retrieved from: https://en.wikipedia.org/wiki/Cold_start_(recommender_systems)#:~:text=Cold%20start%20is%20a%20potential,not%20yet%20gathered%20sufficient%20information, Aug. 6, 2023, 9 Pages.

(Continued)

*Primary Examiner* — Kaveh Abrishamkar
(74) *Attorney, Agent, or Firm* — Workman Nydegger

(57) ABSTRACT

A computing system generates from received user input an initial profile. The initial profile specifies expected behavioral patterns of datasets that are to be received by the computing system. The computing system extracts from received datasets features that are indicative of behavioral patterns of the received datasets. The computing system provides the initial profile to first machine-learning models. The first machine-learning models have been trained using a subset of the received datasets. The first machine-learning models use the initial profile to determine if the behavioral patterns of the received datasets are anomalous. The computing system includes second machine-learning models that have been trained using a subset of the received datasets. The second machine-learning models train a second profile based on the extracted features to specify behavioral patterns of the received datasets that are learned by the second machine-learning model.

17 Claims, 8 Drawing Sheets

(56) References Cited

U.S. PATENT DOCUMENTS

| | | | | |
|---|---|---|---|---|
| 2018/0299495 A1* | 10/2018 | Abbas | ............... | G06F 18/23213 |
| 2019/0035387 A1* | 1/2019 | Zitouni | ................ | G10L 15/063 |
| 2020/0012968 A1 | 1/2020 | Yu et al. | | |
| 2020/0145304 A1* | 5/2020 | Wulff | .................... | H04L 43/045 |
| 2020/0145532 A1* | 5/2020 | Hassan | ................ | H04M 19/04 |
| 2022/0078206 A1* | 3/2022 | Streit | ........................ | G06F 7/02 |

OTHER PUBLICATIONS

"International Search Report and Written Opinion Issued in PCT Application No. PCT/US23/021612", Mailed Date: Jul. 31, 2023, 13 Pages.

* cited by examiner

MACHINE LEARNING APPROACH FOR SOLVING THE COLD START PROBLEM IN STATEFUL MODELS

BACKGROUND

In computing networks, Intrusion Detection Systems (IDS) for cloud services are important and ubiquitous, sometimes even required by compliance policies. The goal of an IDS is to detect and potentially prevent security risks by flagging anomalous and suspicious behavior. While in some cases, anomaly detection is done in a simple rule-based mode (e.g., flagging files with known malware hashes), IDS are commonly stateful, meaning that models of past normal behavior are learned. In the case that a stateful model is stable and informative enough, new behavior that significantly deviates from the model may be flagged as anomalous and potentially suspicious.

New resources may be constantly added to the computing network due to naturally growing business needs. This often requires IDS expansion to new platforms and data sources to cover new security scenarios caused by the new resources. For a new stateful IDS, no state will initially exist. This may lead to the "cold start" problem for the new stateful IDS, which is when new detection and/or new resource are onboarded, and until the model of expected behavior is stable/informative enough, no actual IDS output such as detections of suspicious behavior can be provided.

For example, if the IDS monitors data exfiltration and alerts are expected on anomalous amounts of extracted data or anomalous targets of extraction, alerts should be triggered if the extracted volume is higher than common, or if the target is distant from known targets. However, until the normal volume and usual targets are established, such situations will not be detected. In complex cases where a monitored resource may have a large amount of diverse traffic, the learning period for the IDS to learn the expected behavior can take a matter of weeks, during which there may be no detection provided by the IDS.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments disclosed herein solve the problems discussed above. For example, the embodiments disclosed herein allow a user to input known or expected behavioral patterns of data that will be received on a network. The input known or expected behavioral patterns are then included in an initial profile that is provided to an anomaly detector of an Intrusion Detection System (IDS). The anomaly detector includes one or more first machine-learning models that use the initial profile to perform anomaly detection on received data. This advantageously allows for at some anomaly detection at the moment an IDS is started or when a new resource is added to the network. Accordingly, the user does not need to wait for the long period of time for the IDS to learn the behavioral patterns before receiving at least some anomaly detection protection. User feedback is provided to update the initial profile to provide enhanced protection.

In addition, while the initial profile and its updated versions are being used by the first machine-learning models, one or more second machine-learning models are being trained to learn the actual behavioral patterns of the received data and to include this in a second profile. Because it is unlikely that the user will be able to provide a full set of behavioral patterns in the initial profile, especially when the received data is large, training the second profile with the actual behavioral patterns will eventually provide full anomaly detection protection. To speed up the training of the second profile, the behavioral patterns learned by the first machine-learning models when updating the initial profile based on the user feedback can advantageously be provided to the second machine-learning model for inclusion in the second profile. When the second profile is sufficiently trained to recognize the actual behavioral patterns, the use of the first machine-learning models and the initial profile can be discontinued or the use can be maintained to provide further user input.

One embodiment is related to a computing system uses a user generated initial profile including known behavioral patterns to detect anomalies in received data using a first machine-learning model while in parallel training a second machine-learning model to learn the behavioral patterns of the received data so that the second machine-learning model can detect the anomalies. The computing system generates from received user input an initial profile. The initial profile specifies expected behavioral patterns of datasets that are to be received by the computing system. The computing system extracts from received datasets features that are indicative of behavioral patterns of the received datasets. The computing system provides the initial profile to first machine-learning models. The first machine-learning models have been trained using a subset of the received datasets. The first machine-learning models use the initial profile to determine if the behavioral patterns of the received datasets are anomalous. The computing system includes second machine-learning models that have been trained using a subset of the received datasets. The second machine-learning models train a second profile based on the extracted features to specify behavioral patterns of the received datasets that are learned by the second machine-learning model.

In some embodiments, the computing system provides an indication of the anomalous instances of the received datasets to a user agent. The user agent determines if the instances of the received datasets that were indicated as being anomalous are actually anomalous and provides this feedback to the computing system. The computing system updates the initial profile to an updated initial profile based on the feedback and provides the updated initial profile to the first machine-learning model for further use in anomaly detection. In some embodiments, a new updated initial profile is generated every time new feedback is received from the user agent. In some embodiments, the computing system provides what was learned from the user feedback to the second machine-learning models to thereby speed up the training of the second profile. In some embodiments, a security alert is generated when instances of the received datasets that are indicated as being anomalous In some embodiments, the second profile is used to determine if the behavioral patterns of the received datasets are anomalous. This may happen while the second profile is being trained and/or when the second profile is fully trained and is considered a real profile. In some embodiments, the second profile is considered a real profile when a confidence level for the second machine-learning models and the second profile is sufficiently high. In some embodiments, when the confidence level is sufficiently high, the first machine-learning model and the initial profile are no longer used.

In some embodiments, the input received from the user to generate the initial profile is one or more of (1) user described behavioral patterns from common data events, (2) behavioral patterns derived from simulations of common computing system activities, or (3) behavioral patterns derived from configuration settings of resources using the computing system. In some embodiments the expected behavioral patterns include one or more of a known IP list, a known application list, expected traffic thresholds, expected authentication methods, expected naming, expected activity times, a device name or identification, an account name, an organization name, a day of a week data events are likely to occur, a time of a day data events are likely to occur, a username, or a location where data events are likely to occur.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

The embodiments disclosed herein solve the problems discussed above. For example, the embodiments disclosed herein allow a user to input known or expected behavioral patterns of data that will be received on a network. The input known or expected behavioral patterns are then included in an initial profile that is provided to an anomaly detector of an Intrusion Detection System (IDS). The anomaly detector includes one or more first machine-learning models that use the initial profile to perform anomaly detection on received data. This advantageously allows for at some anomaly detection at the moment an IDS is started or when a new resource is added to the network. Accordingly, the user does not need to wait for the long period of time for the IDS to learn the behavioral patterns before receiving at least some anomaly detection protection. User feedback is provided to update the initial profile to provide enhanced protection.

In addition, while the initial profile and its updated versions are being used by the first machine-learning models, one or more second machine-learning models are being trained to learn the actual behavioral patterns of the received data and to include this in a second profile. Because it is unlikely that the user will be able to provide a full set of behavioral patterns in the initial profile, especially when the received data is large, training the second profile with the actual behavioral patterns will eventually provide full anomaly detection protection. To speed up the training of the second profile, the behavioral patterns learned by the first machine-learning models when updating the initial profile based on the user feedback can advantageously be provided to the second machine-learning model for inclusion in the second profile. When the second profile is sufficiently trained to recognize the actual behavioral patterns, the use of the first machine-learning models and the initial profile can be discontinued or the use can be maintained to provide further user input.

Figure 1A:
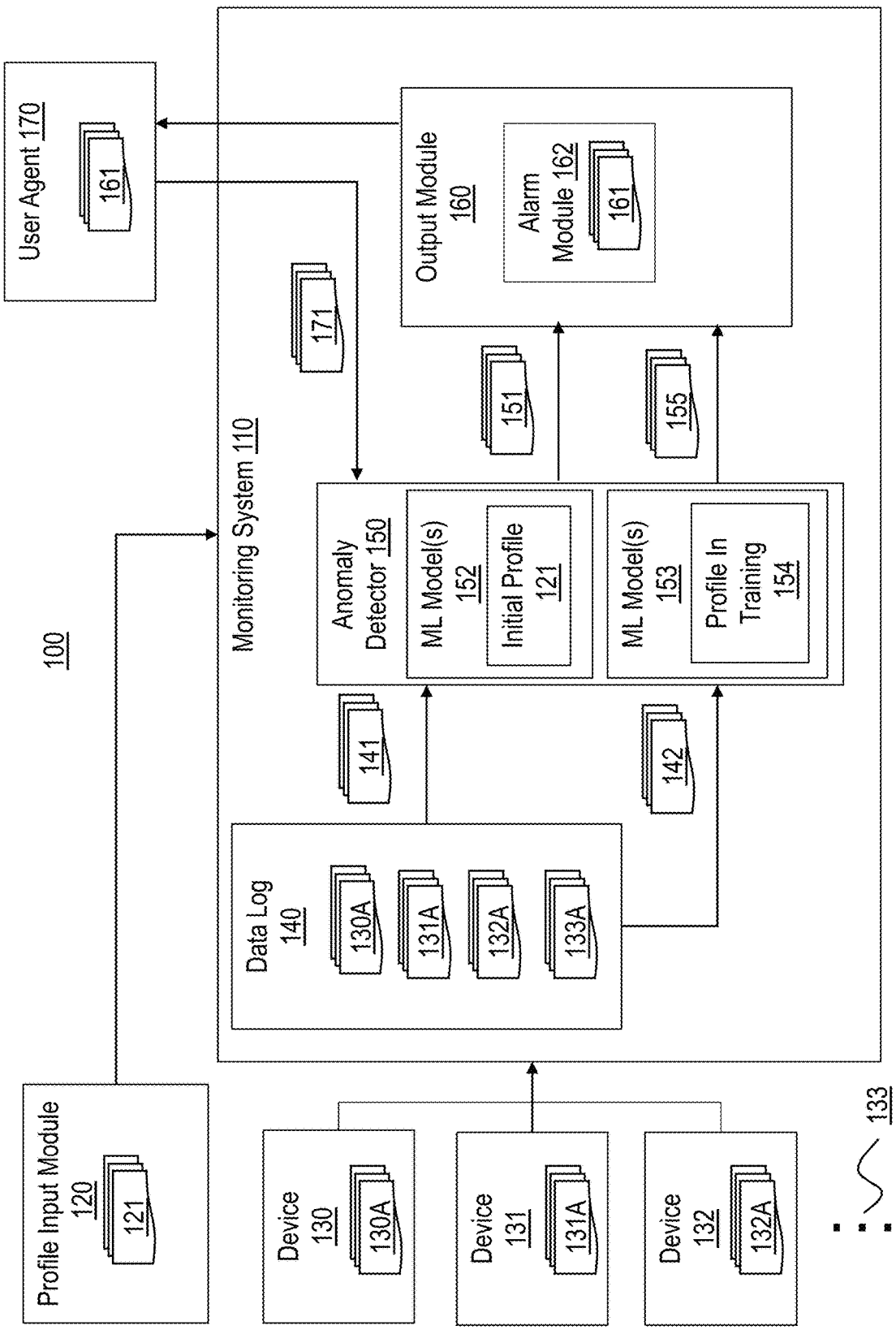
FIGS. 1A and 1B illustrate an example network that implements the embodiments described herein.

FIG. 1A illustrates an example network 100 that implements the principles described herein. As illustrated in FIG. 1A, the network 100 includes a monitoring system 110 that is configured to monitor data received from various devices as the devices interact with the network 100. The monitoring system 110 is an example of an Intrusion Detection System (IDS). Based on the monitoring of the data, the monitoring system 110 is able to determine if any of the received data is anomalous based on features that are extracted from the data and that are compared to expected behavioral patterns of the received data to determine if the current received data is anomalous or not A user of the monitoring system 110 is then able to investigate if any of the anomalous data is indicative of a malicious actor or intent or is simply a benign anomaly.

As will be appreciated, when the monitoring system 110 is initially put into operation, the monitoring system 110 will have no expected behavioral patterns that it can use to help determine any anomalies in the received data since anomaly detection has just begun. Thus, the monitoring system 110 typically must undergo an unsupervised learning process to learn a profile of expected behavioral patterns of the received data before the monitoring system can detect any anomalies. This process can often take a long time, such as a few weeks or longer, during which time the monitoring system 110 is not able to provide sufficient anomaly detection for the network 100.

Accordingly, in the embodiments disclosed herein, the network 100 includes a profile input module 120. Although illustrated as being separate from the monitoring system 110, in some embodiments the profile input module 120 may be part of the monitoring system 110. In operation, the profile input module 120 allows a user of the network 100 to generate an initial profile 121 that lists expected or known behavioral patterns the user would like the monitoring system 110 to use when an anomaly detector 150 of the monitoring system 110 detects anomalies in the received data. Thus, the initial profile 121 acts as a baseline for an anomaly detector 150 when performing anomaly detection as will be explained in more detail to follow. The expected or known behavioral patterns included in the initial profile 121 are based on the user's historical knowledge of such behavioral patterns in the data received from devices interacting with the network 100.

Figure 2:
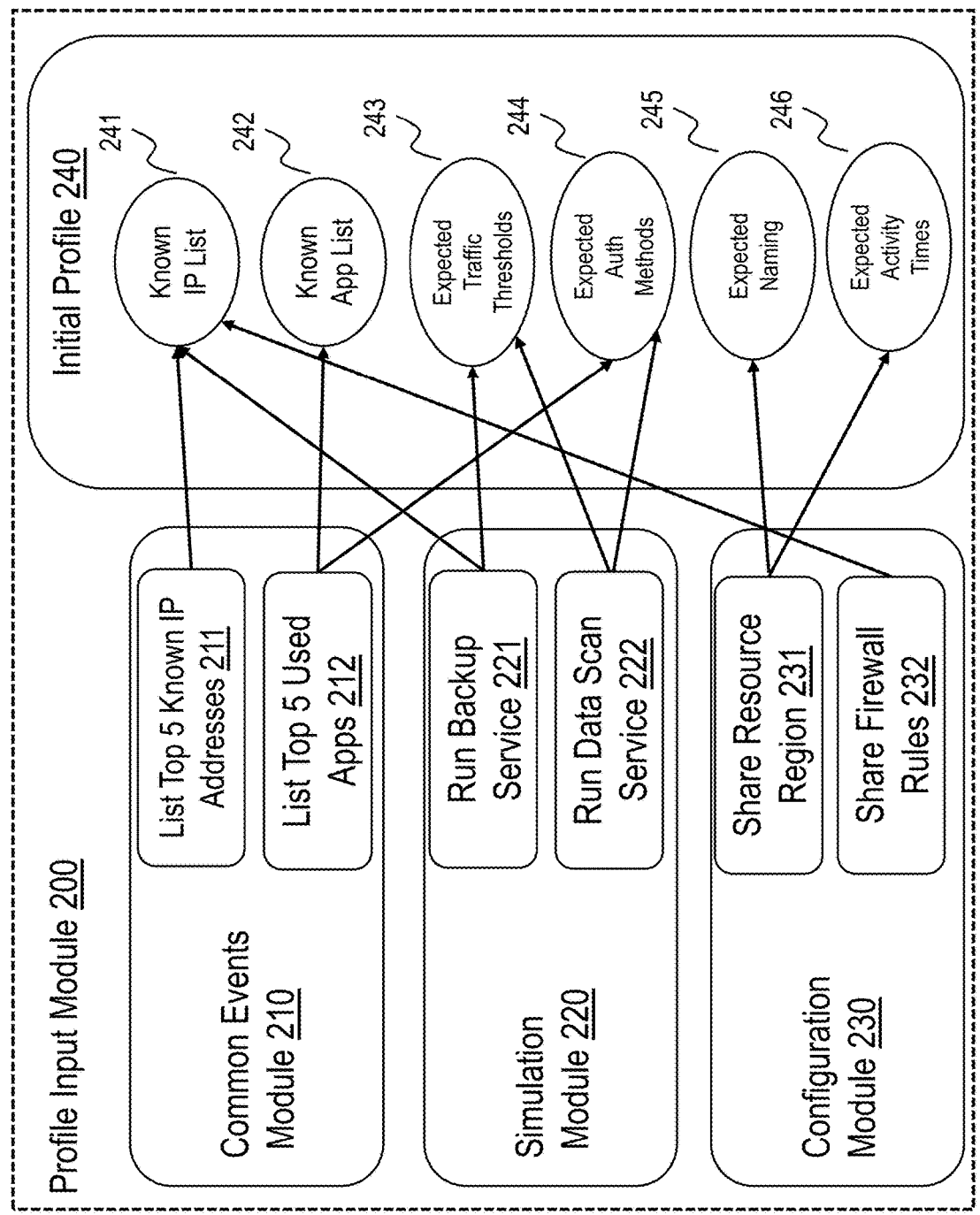
FIG. 2 illustrates an example profile input module and initial profile.

FIG. 2 illustrates an example embodiment of a profile input module 200 that corresponds to the profile input module 120 and that is used to receive user input to generate an initial profile 240 that corresponds to the initial profile 121. As shown, the profile input module 200 includes a common events module 210. In operation, the common events module 210 allows the user to describe common data events that occur on the network 100. That is, the user is able to describe known legitimate behavior patterns for the received data that are relevant to the monitoring system 110. For example, in the case that IP addresses or applications are monitored by the monitoring system 110, the user can list the top five known IP addresses as shown at 211 and/or list the top five used applications as shown at 212. Of course, other known behavior patterns can also be described. These described known behavior patterns can be listed in the initial profile 240.

The profile input module 200 also includes a simulation module 220. In operation, the simulation module 220 allows the user to run simulations of significant procedures or activities to show legitimate behavior patterns of the received data. For example, as shown at 221 the user can run a backup service or as shown at 222 the user can run a data scan service. In addition, other activities such as recurring queries can also be run. By running these simulations of the significant procedures or activities, the behavioral patterns monitored during the simulations such as amounts of extracted data and/or types of operations can be determined and listed in the initial profile 240.

The profile input module 200 also includes a configuration module 230. In operation, the configuration module 230 allows configurations, policies and general settings of resources connected to the network 100 to be used to automatically suggest legitimate behavioral patterns. For example, normal working hours can be extrapolated from regional settings as shown at 231 and/or IP addresses can be learned from existing firewall rules as shown at 232. Of course, other configurations, settings, and policies of the connected resources can also be used to suggest legitimate behavioral patterns. The behavioral patterns suggested by the configurations, policies, and general settings can be listed in the initial profile 240. Although three different ways to describe or determine legitimate behavioral patterns of the received data has been described, it will be appreciated that there are numerous other ways that profile input module 220 can be used to generate the initial profile 240.

FIG. 2 also illustrates an example embodiment of the initial profile 240. As illustrated, the initial profile 240 may include various expected or known behavioral patterns that were entered by the user using the common events module 210 and/or were determined by the simulation module 220 and the configuration module 230. As shown in the figure, each of these modules may contribute one or more expected or known behavioral patterns to the initial profile. In addition, a particular expected or known behavioral pattern can be contributed by more than one of the modules. Thus, the initial profile 240 is gradually built up using a combination of different inputs received by the profile input module 200.

In the illustrated embodiment, the initial profile 240 includes the following expected or known behavioral patterns: a known IP list 241, a known application list 242, expected traffic thresholds 243, expected authentication methods 244, expected naming, 245, and expected activity times 246. Although not illustrated, the initial profile 240 may include any number of additional expected or known behavioral patterns as circumstances warrant. Other expected or known behavioral patterns include, but are not limited to, a device name or identification, an account name, an organization name, a day of a week data events are likely to occur, a time of a day data events are likely to occur, a username, or a location where the data events are likely to occur. Accordingly, the embodiments disclosed herein are not limited by the number or types of behavioral patterns included in the initial profile.

Returning to FIG. 1A, as illustrated, various devices 130, 131, 132, and any number of additional devices as illustrated by the ellipses 133 are coupled to the monitoring system 110. The devices 130-133 may be devices such as a laptop computer, a desktop computer, or a mobile device that interact with the network 100. Each of the devices 130-133 may be associated with a different user identification (ID), such as an email address, password, company or organization name, IP address, or another identifier that uniquely identifies the user or owner of the device or the device itself. Alternatively, a single user ID may be associated with more than one of the devices, for example when a user uses the same user ID for both a laptop computer and a mobile device. The users associated with the IDs may be human users or they may be an organization or service or some other non-human user.

In operation, the device 130 provides data 130A to the monitoring system 110, the device 131 provides data 131A to the monitoring system 110, and the device 132 provides data 132A to the monitoring system 110. In addition, any of the additional devices 133 may provide data 133A to the monitoring system 110. The data may be a dataset that associates the user ID of the relevant device with a specific instance of data received from the device. In other words, every time that that one of the devices 130-133 interacts in some way with the network 100, such as logging onto the network 100 or extracting data from the network 100, data is generated for the interaction. As will be described in more detail to follow, each specific instance of data received from the device is associated with various features that describe or give context to the received data.

The data 130A, 131A, 132A and potentially 133A is received by a data log or store 140. As shown in FIG. 1A, the monitoring system 110 includes the anomaly detector 150. In one embodiment, the anomaly detector 150 receives the data from the data log 140 as shown at 141 and detects anomalies in the data using one or more machine-learning models 152. In other embodiments, the data 130A, 131A, 132A and potentially 133A may be received by the anomaly detector 150 directly from the devices 130-133. The one or more machine-learning models 152 are trained on at least a subset of the data 141 received from the data log 140 or a subset of the data received directly from the devices 130-133.

As previously discussed, the initial profile 121 is generated and provided to the anomaly detector 150. The initial profile 121 is used by the machine-learning models 152 in a supervised or semi-supervised training process. That is, the machine-learning models 152 uses the behavioral patterns listed in the initial profile 121 as a baseline state when determining if the received data is anomalous or not as will be explained in more detail to follow. Thus, the use of the initial profile 121 advantageously provides the technical benefit of providing a simulated baseline that can be used as training data for the machine-learning model. This in turn gives the machine-learning models the ability to begin at least some anomaly detection on the received data at the time the anomaly detector is put into operation. Thus, there is no need to wait for the machine-learning models to learn a baseline state before any anomaly detection can be performed.

The anomaly detector 150 performs anomaly detection on the received data 141 and determines if each instance of the data is either an anomaly or is normal (i.e., not anomalous). The anomaly detector 150 then indicates as shown at 151 if each instance of the data is either an anomaly or is normal. In one embodiment, this may be done by comparing the received data with the expected or known behavioral patterns listed in the initial profile 121. When the behavioral patterns of the received data comports with the expected or known behavioral patterns, the data is likely normal and when the behavioral patterns of the received data does not comport with the expected or known behavioral patterns, the data is likely anomalous.

The monitoring system 110 includes an output module 160. In operation, the output module 160 uses an alarm module 162 to generate a security alert 161 for those instances of the received data that are indicated as being anomalous. The security alert 161 is then provided to a user agent 170, such as a web browser or other computing system, of the user of the monitoring system 110 to thereby allow the user to investigate and to take appropriate steps if the anomaly is malicious. In some embodiments, the security alert 161 is sent as a suggestion to the user agent and no action is taken in relation to an anomaly by the monitoring system unless directed by the user.

The user agent 170 is able to determine if each instance of the received data that was indicated as being anomalous so as to trigger the security alert 161 is actually an anomaly. For example, suppose that the initial profile 121 included a listing of the five known IP addresses and that the anomaly detector 150 using the machine-learning models 152 detected that an instance of the received data included an IP address that was not listed as one the five known IP addresses. In such case, the anomaly detector 150 would label the received data as anomalous since it included an IP address that was not expected or known and would trigger the security alert 161. Suppose further that the detected IP address was actually an IP address of the user, but that the user had forgotten to add this IP address to the list of known IP addresses when the initial profile 121 was generated. In such case, the user agent is able to provide feedback 171 to inform the anomaly detector 150 that the data has been improperly labeled as anomalous. The machine-learning models 152 can then update the initial profile 121 to include the new IP address in the list of expected or known behavioral patterns. Although an IP address was used in this example, the feedback 171 can apply to any of the expected or known behavioral patterns included in the initial profile 121. In this way, through use of the feedback 171, the initial profile 121 can continuously be updated, which is turn allows the machine-learning models 152 to be more accurate. Accordingly, the use of the feedback 171 provides the technical benefit of updating the initial profile, which in turn provides more accuracy for the anomaly detection performed using the initial profile as the baseline.

It will be appreciated that it is unlikely that the user of the monitoring system 110 will be able to remember or to provide all relevant expected or known behavioral patterns to include in the initial profile 121, especially if the data interacting with the network 100 is large. For example, the user may have a small number of customers in a given location, but because the number is small the user forgets to include this location in the initial profile. Accordingly, in parallel with training/updating the initial profile 121 using the machine-learning models 152, a real profile in training 154 is initiated using machine-learning models 153. Because the real profile in training 154 is not based on any historical or user input data, the training of the real profile in training using the machine-learning models 153 is typically an unsupervised training process. Accordingly, it will generally take some time, for example several weeks for a large amount of data, for the profile in training 154 to reach a level where enough received data has been analyzed by the machine-learning models so that the models can begin to accurately detect anomalies. That is, it will generally take some time for the machine-learning models to learn the expected or known behavioral patterns and to list these in the profile in training 154.

As shown in FIG. 1A, the anomaly detector 150 receives the data from the data log 140 as shown at 142 and detects anomalies in the data using the one or more machine-learning models 153. In other embodiments, the data 130A, 131A, 132A and potentially 133A may be received by the anomaly detector 150 directly from the devices 130-133. The one or more machine-learning models 153 are trained on at least a subset of the data 142 received from the data log 140 or a subset of the data received directly from the devices 130-133.

During the training process, the machine-learning models 153 begin to generate the profile in training 154 as behavioral patterns about the data 142 is learned by the machine-learning models. Thus, as the behavioral patterns are learned, these are continually added to and updated in the profile in training 154. The profile in training 154 is then used by the machine-learning models 153 when detecting anomalies in the received data. As shown, the machine-learning model 153 uses the profile in training 154 to perform anomaly detection on the received data 142 and determines if each instance of the data is either an anomaly or is normal (i.e., not anomalous). The anomaly detector 150 then indicates as shown at 155 if each instance of the data is either an anomaly or is normal. In one embodiment, this may be done by comparing the received data with the learned behavioral patterns listed in the profile in training 154. When the behavioral patterns of the received data comports with the learned behavioral patterns, the data is likely normal and when the behavioral patterns of the received data does not comport with the learned behavioral patterns, the data is likely anomalous.

Figure 1B:
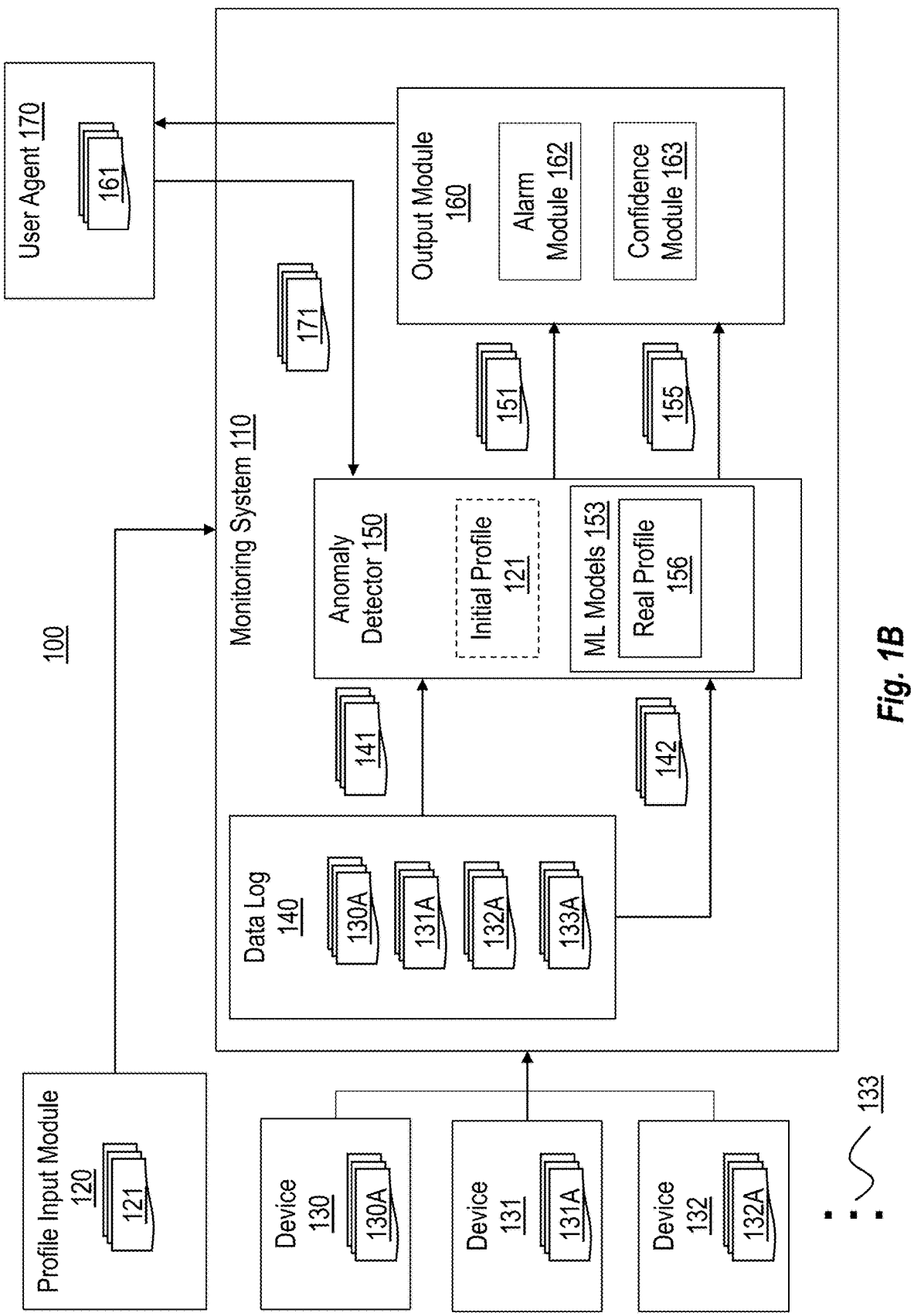

FIG. 1B illustrates the network 100 after a period of time has passed since the anomaly detection was initiated using the machine-learning models 152 and 153. As illustrated, the output module 160 also includes a confidence module 163. In operation, the confidence module 163 determines when the data that is indicated as being anomalous at 155 reaches a level that where the machine-learning models 153 can be deemed to be sufficiently trained so as to perform anomaly detection with confidence. For example, in one embodiment the confidence module 163 may compare the results of the machine-learning models 152 with that of the machine-learning models 153. When the results of the machine-learning models 153 reach a comparable level to those of the machine-learning models 152, then the confidence module 163 may determine that the machine-learning models 153 and the profile in training 154 are sufficiently trained to perform anomaly detection with confidence.

In another embodiment, the confidence module 163 may assign dynamically changing weights to the results of the learning models 152 and the machine-learning models 153. Thus, initially the results of the learning models 152 that use the initial profile 121 (and updated versions) will be weighted higher than the results of the machine-learning model 153 that use the profile in training 154. As time progresses, the relative weighting of the results will dynamically change until such time that results of the machine-learning models 153 is higher. At such time, the confidence module 163 may determine that the learning models 153 and the profile in training 154 are sufficiently trained to perform anomaly detection with confidence.

In still other embodiments, the confidence module 163 may simply track the amount of time that has passed since the anomaly detection began and will consider that the learning models 153 and the profile in training 154 are sufficiently trained to perform anomaly detection with confidence after the passage of some predetermined time. In further embodiments, the confidence module 163 applies policies or rules that determine when a proper confidence level has been reached.

Once the learning models 153 and the profile in training 154 are sufficiently trained to perform anomaly detection with confidence, the profile in training 154 may be considered a real profile 156 as it should now include those features related to the known behaviors that have been learned by the machine-learning models 153. At such time, the anomaly detector 150 may discontinue use of the machine-learning models 152 and the initial profile 121. This is indicated by the dashed lines in FIG. 1B. In some embodiments, the initial profile 121 or more specifically the updated versions of the initial profile 121 are merged into the real profile 156. In this way, the known behaviors learned during the training process of the machine-learning models 152 can be used to help with the generation of the real profile 156 and the training of the machine-learning models 153. In still other embodiments, the user can retain the training of the machine-learning models 152 and the updating of the initial profile 121 using the feedback 171 to allow an interactive way for the user to provide feedback to help with the accuracy of the anomaly detection. The updated initial profile can then be continuously merged into the real profile 156. Merging what has been learned during the process of continually updating the initial profile 121 into generating the real profile 156 provides the technical benefit of speeding up the training of the real profile, which in turn helps to speed up the ability of the anomaly detector 150 to accurately detect anomalies in the received data.

Figure 3A:
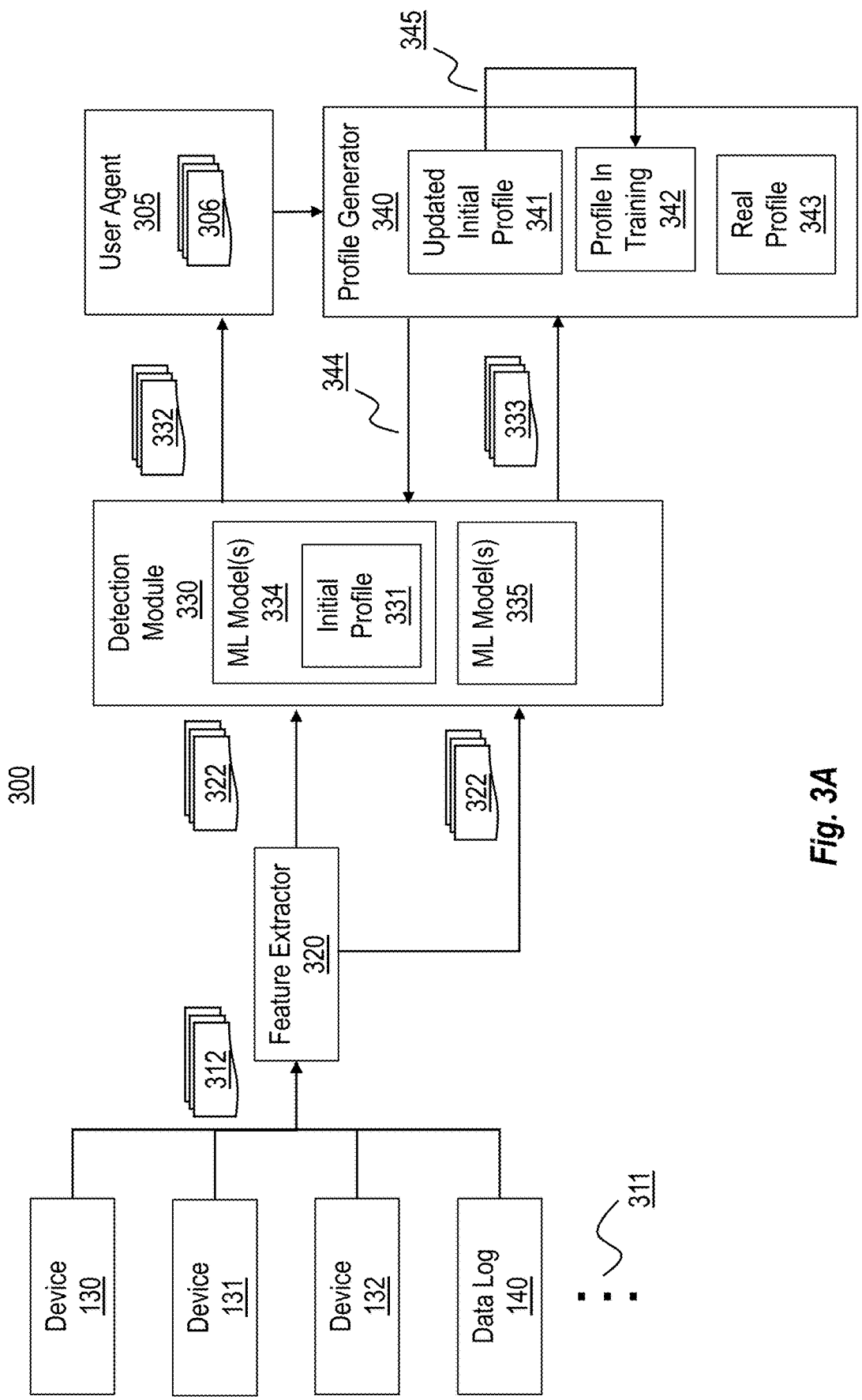
FIGS. 3A and 3B illustrate an example architecture of the anomaly detector of FIGS. 1A and 1B.

FIG. 3A illustrates an example of training and updating an initial profile 331 using one or more machine-learning models 334, which correspond to the initial profile 121 and machine-learning modules 152 in FIGS. 1A and 1B. FIG. 3A also illustrates training a profile in training 342 using one or more machine-learning models 335, which correspond to the profile in training 154 and machine-learning modules 153 in FIGS. 1A and 1B. Although FIG. 3A illustrates the training being performed by a computing system that is the as the same computing system that provides the monitoring system 110 in FIGS. 1A and 1B this need not be the case. In some embodiments, the a computing system different from the computing system that provides the monitoring system 110 may be used to in the training process.

FIG. 3A illustrates an example architecture of an anomaly detector 300, which corresponds to the anomaly detector 150 in FIGS. 1A and 1B. As illustrated in FIG. 3A, the anomaly detector 300 includes a feature extractor 320, which is configured to obtain one or more datasets 312, which may correspond to instances of the received data 130A-133A. The one or more datasets 312 can be obtained from at least one of (1) the device 130, (2) the device 131, (3) the device 132, and/or (4) the data log 140. The ellipsis 311 represents that there may be additional sources from which the feature extractor 320 may obtain the one or more datasets 312, such as the additional devices 133.

In response to receiving the data 130A-133A, the feature extractor 320 is configured to extract a plurality of features 322 from the one or more datasets 312. The plurality to features 322 describe or give context to the received data and help to describe the behavior of each instance of the received data. For example, the extracted features 322 may be, but are not limited to, an IP address, a location of data extraction, a time of data extraction, executed applications, traffic thresholds, naming configurations, a device name or identification, an account name, and an organization name.

The extracted plurality of features 322 are then fed into a detection module 330 that includes the machine-learning models 334 and the machine-learning models 335. As illustrated, the plurality of features are fed in parallel to the machine-learning models 334 and the machine-learning models 335.

The operation of the machine-learning models 334 will first be described. The one or more learning models 334 may be considered supervised or semi-supervised models because they use the initial profile 331 as a baseline when performing anomaly detection. In some embodiments, there may be any number of expected or known behavioral patterns that can be included in the initial profiled 331 such as: a known IP list, a known application list, expected traffic thresholds, expected authentication methods, expected naming, expected activity times, a device name or identification, an account name, an organization name, a day of a week data events are likely to occur, a time of a day data events are likely to occur, a username, or a location where the data events are likely to occur.

In operation, the one or more machine-learning models 334 detect anomalies in the received data using the initial profile 331. That is, when the behavior of the training data deviates from the behavior listed in the initial profile, a potential anomaly is detected. For example, if an instance of the received data includes the name of an executed application as an extracted feature 322, and if application name deviates from the list of known applications included in the initial profile 331, then an anomaly may be detected.

The detection module 330 may send output data 332, which corresponds to the security alert 161, to a user agent 305 that is not part of the anomaly detector 300 and that corresponds to the user agent 305 that informs the user agent of the potential anomaly. The user agent 305, which may be a computing browser or other device or may be a human agent that uses the computing device, evaluates the output data 332 to determine if the potential anomaly is actually an anomaly. For example, if the application name is not included in the list of known application names, but is known to the user as being an expected or known application, the user agent may generate feedback 306 that is sent to a profile generator 340 of the anomaly detector 300. Of course, the use of the application name is a simple example of the output data 332 and the feedback 306. In operation, the output data 332 will include a number of different features extracted from the received data that are potentially anomalies. Likewise, the feedback 306 will include any number of user input indicating if the potential anomaly is actually an anomaly or not.

The profile generator 340 processes the feedback 306 and is configured to generate an updated initial profile 341 based on the feedback 306. For example, if the application name is known to the user as being an expected or known application, then the application name will be added to the list of application names in the updated initial profile 341. As shown at 344, the updated initial profile 341 is then provided to the detection module 330, where it can be used by the machine-learning models 334 to detect further anomalies. A new updated initial profile 341 may be generated every time new user feedback 306 is received. Thus, based on the user feedback 306, behavioral patterns that were detected as being anomalous, but are known or expected by the user, can be added to the various updated initial profiles 341. This process can continuously be repeated until such time as the profile in training 342 has reached a confidence level where the use of the updated initial profile 341 is no longer needed. In some embodiments, however, the process of updating the initial profile and using the updated profile in anomaly detection can be maintained for as long as a user desires.

As mentioned previously, the extracted features 322 are fed in parallel to the to the one or more machine-leaning models 335. The one or more machine-learning models 335 may be considered unsupervised or semi-supervised as they do not rely on any historical data when training a profile. Instead, the one or more training models train the profile in training 342 over time by learning behavioral patterns from the extracted features 322 and adding those behavioral patterns that become expected or known to the profile in training 342.

In one embodiment, the machine-learning models 335 embody a score generator. The one or more machine-learning models 335 is configured to generate a probability score 333, indicating a probability that a given instance of the received data is anomalous.

Figure 4:
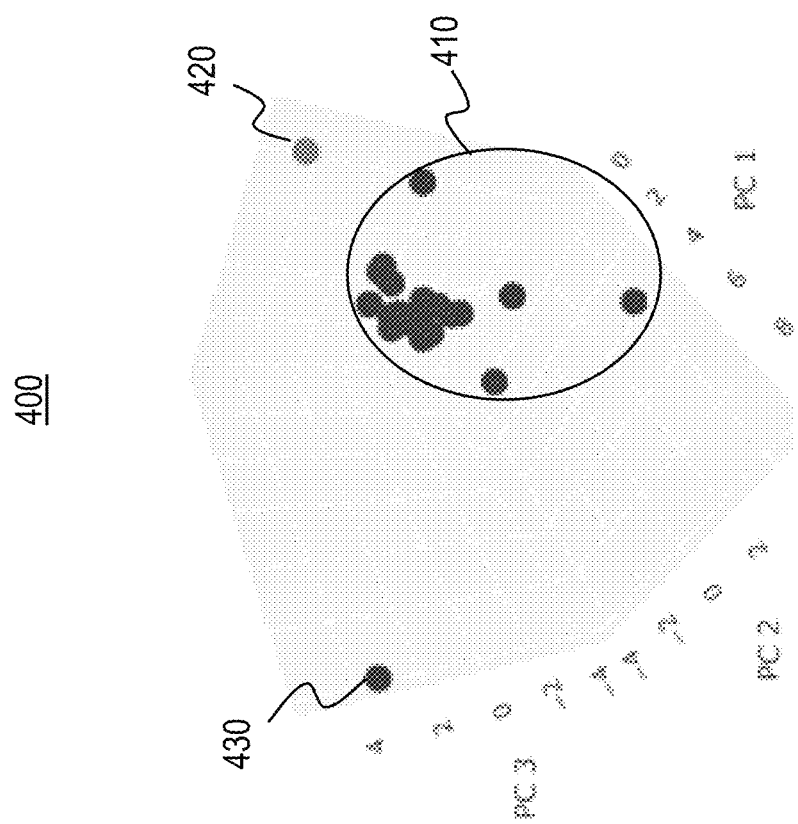
FIG. 4 illustrates an example of a cluster graph of multiple instances of received data.

In one embodiment, the probability score 333 may be based a distance between the anomalous instances of the received data and normal instances of the received data as shown in a cluster. For example, FIG. 4 shows a cluster graph 400 as a visualization that shows multiple instances of the received data, such as the received data 130A-133A. As shown in the figure, the majority of the data instances are close to each other as indicated by the circle 410. However, a data instance 420 and a data instance 430 are some distance from the circle 410. Using this distance, the score generator, using the machine-learning models 335, generates a probability score 333 for those data instances within the circle 410 that indicates that they are normal since they are located relatively close together. In addition, the score generator, using the machine-learning models 335, generates a probability score 333 for the data instance 420 and the data instance 430 that indicates that they are anomalous since they have a relatively large distance from the circle 410. It will be appreciated that the example shown in FIG. 4 is only one of many different ways that a score generator, using the machine-learning models 335, may generate the probability score 333.

The probability score 333 is then processed by the profile generator 340. In some embodiments, when the probability score 333 for a given data instance is less than a predetermined threshold, the profile generator 340 labels that data instance as a "normal". Conversely, when the probability score 333 for a data instance is greater than the predetermined threshold, the profile generator 340 labels that data instance as a "anomalous". The profile generator 340 adds those data instances that are labeled as being normal to the profile in training 342.

As indicated by 344, the machine-learning models 335 continually learn the behavioral patterns of the received data as more of the data is evaluated. The profile in training 342 is continually updated based on this learning.

In addition, as previously explained, the expected behavioral patterns that are learned by the one or more machine-learning models 334 based on the user feedback 306 and added to the updated initial profiles 341 can be merged into the profile in training 342 to speed up the training process of the profile in training 342 as indicated by 345. When the profile in training is trained sufficiently that a confidence of the profile is high enough, then the profile in training 342 may be considered a real profile 343 that is used by the machine-learning models 335 in anomaly detection.

In some embodiments, for each different feature or behavioral pattern in the initial profile and/or the profile in training, a separate anomaly detection model is trained. As such, multiple machine-learning models may be used to train and update the initial profile and the profile in training. Different machine-learning techniques may be implemented. In some embodiments, clustering-based anomaly detection techniques are used to train a model to detect a distance between the anomalous instances of received data and normal instances of received data as explained in FIG. 4. Many different machine-learning algorithms may be used to train the machine-learning models, including (but not limited to) convolutional neural networks, multilayer neural networks, recursive neural networks, deep neural networks, logistic regression, isolation forest, k-nearest neighbors, support vector machines (SVM), density-based algorithm, elliptic envelope, local outlier factor, Z-score, Boxplot, statistical techniques, time series techniques, or any other reasonable machine-learning algorithms.

Figure 3B:
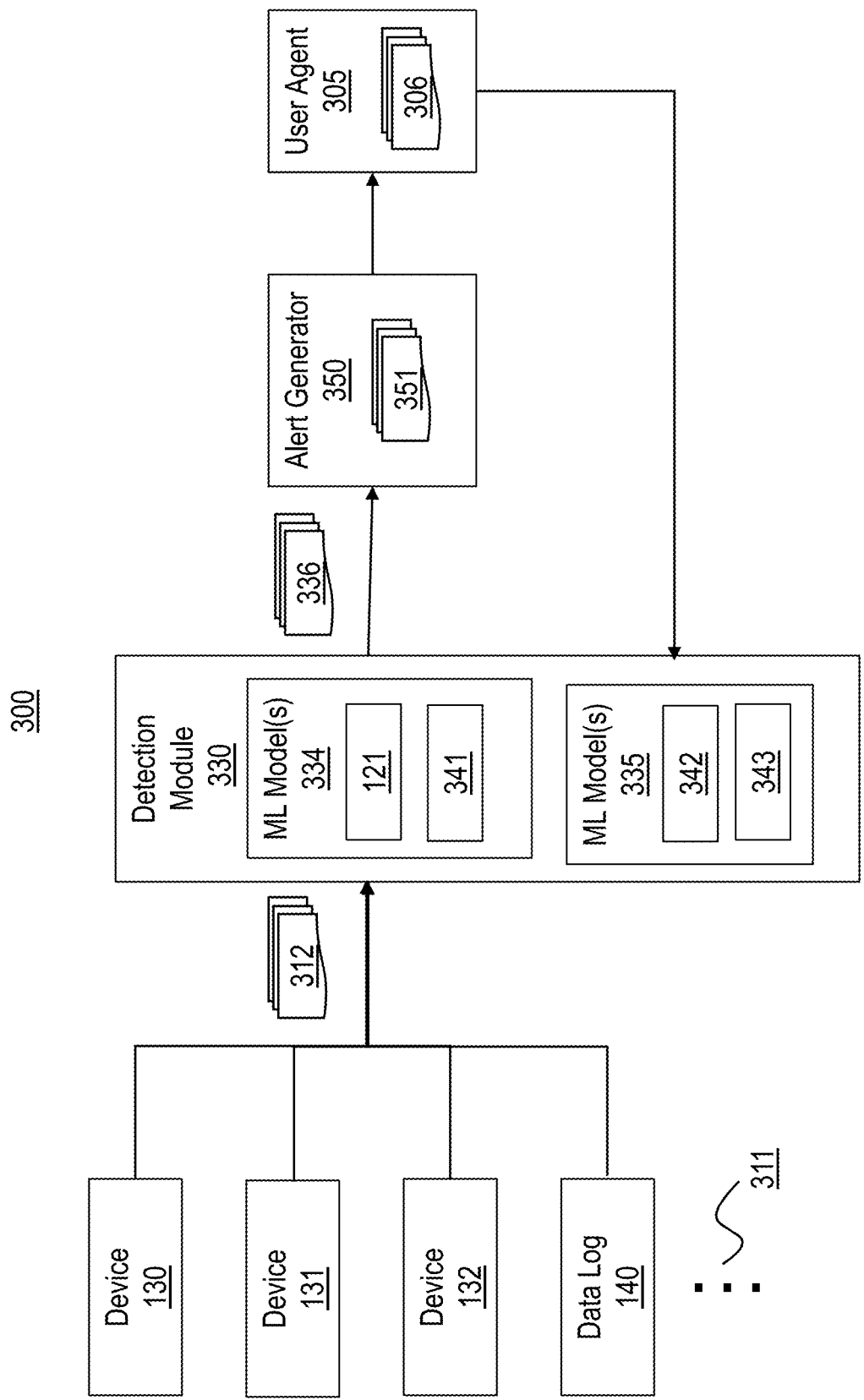

FIG. 3B further illustrates the example architecture of the anomaly detector 300. In the embodiment of FIG. 3B, the anomaly detector 300 is being operated to perform anomaly detection using either the profile in training 342 as it is being trained and the real profile 343 that was generated by the training of the profile in training 342 as previously described. In addition, the anomaly detector 300 is being operated to perform the anomaly detection using the initial profile 121 and the updated initial profile 341 that may be continually updated in those embodiments where the use of the initial profile 121 has not been discontinued as previously described.

As illustrated, the detection module 330 receives the one or more datasets 312 from the devices 130-133 and/or the data log 140. In response to receiving the one or more labeled datasets 312, the detection module 330 is configured to detect anomalies in the one or more datasets 312. For example, the one or more machine-learning models 334 detect anomalies in the one or more datasets 312 initially using the initial profile 121 and then using the various versions of the updated initial profile 341. That is, when the behavioral patterns of the one or more datasets 312 deviates from the behavioral patterns listed in the initial profile and/or the updated initial profile, an anomaly is detected. Likewise, the one or more machine-learning models 335 detect anomalies in the one or more datasets 312 using the profile in training 342 as it is being trained and/or the real profile 343. That is, when the behavioral patterns of the one or more datasets 312 deviates from the behavioral patterns listed in the profile in training 342 and/or the real profile 343, an anomaly is detected.

The detection module 330 sends the detected anomalies as output 336 to an alert generator 350. The alert generator 350 is configured to process the output 336 and to generate a security alert 351. In some embodiments, the security alert is sent to the user agent 305 so that the user can review the security alerts 351 to determine if the detected anomaly is malicious or benign. The user is then able to take appropriate steps to mitigate any issues caused by the malicious anomaly. The user agent can then send feedback 306 to the detection module 330 as needed to further help in the anomaly detection process, for example by further labeling the datasets as anomalous or not. In other embodiments, the alert generator 350 is configured to automatically shut down the reception of data from a source when an anomaly is detected to ensure that no malicious harm is done to the network 100 until such time as the anomaly can be investigated and mitigated.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
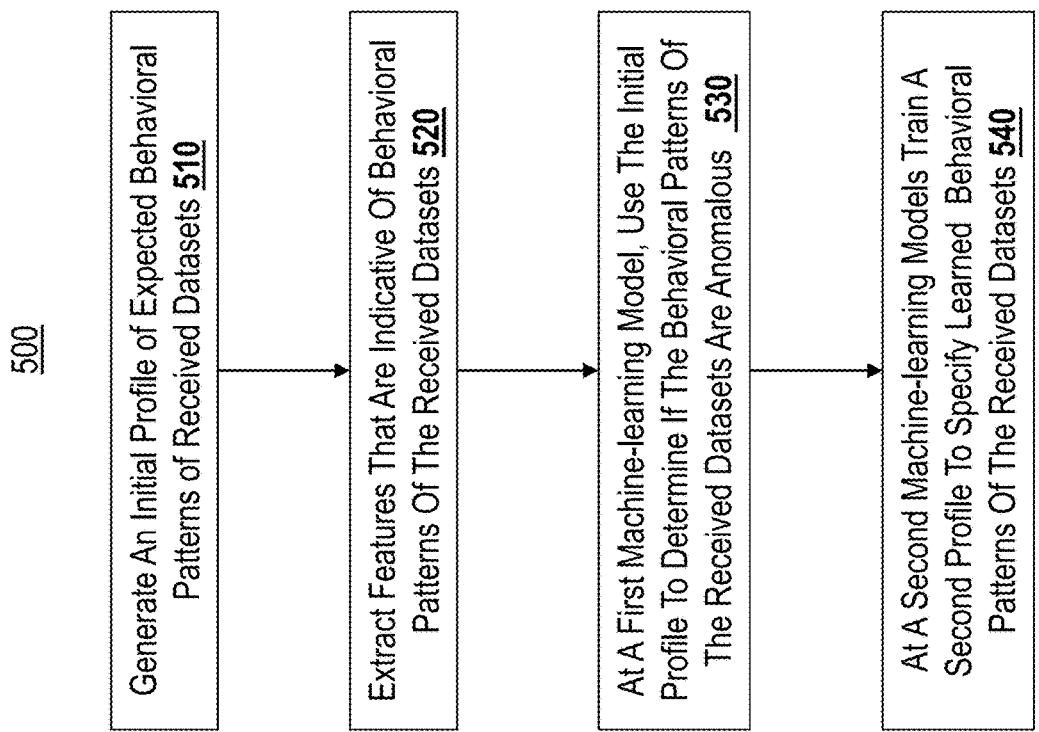
FIG. 5 illustrates a flowchart of an example method for a computing system to use a user generated initial profile including known behavioral patterns to detect anomalies in received data using a first machine-learning model while in parallel training a second machine-learning model to learn the behavioral patterns of the received data so that the second machine-learning model can detect the anomalies.

FIG. 5 illustrates a flowchart of an example method 500 for a computing system to use a user generated initial profile including known behavioral patterns to detect anomalies in received data using a first machine-learning model while in parallel training a second machine-learning model to learn the behavioral patterns of the received data so that the second machine-learning model can detect the anomalies. The method 500 will be described with respect to one or more of the figures previously discussed.

The method 500 includes generating, from user input received from a user of a computing system, an initial profile that specifies expected behavioral patterns of datasets that are to be received by the computing system (510). For example, as previously described the user uses the input module 200 to input known or expected behavioral patterns of data interacting with the network 100. The input received from the user to generate the initial profile is one or more of (1) user described behavioral patterns from common data events, (2) behavioral patterns derived from simulations of common computing system activities, or (3) behavioral patterns derived from configuration settings of resources using the computing system. Examples of the behavioral patterns have been previously described. The initial profile 121, 240, 331 is generated in response to the user input.

The method 500 includes extracting from one or more received datasets received by the computing system one or more features that are indicative of behavioral patterns of the one or more received datasets (520). For example, as previously described the features 322 are extracted from the received datasets 312 by the feature extractor.

The method 500 includes providing the initial profile to one or more first machine-learning models, the one or more first machine-learning models having been trained using a subset of the one or more datasets, the one or more first machine-learning models using the initial profile to determine if the behavioral patterns of the received datasets are anomalous (530). For example, as previously described the one or more machine-learning models 152, 334 use the initial profiles 121, 240, 331 to determine if the behavioral patterns of the received datasets 312 are anomalous. In one embodiment, the machine-learning models 152, 334 compare the behavioral patterns of the received datasets with the known or expected behavioral patterns included in the initial profiles 121, 240, 331. Those instances of the dataset that do not compare with the known or expected behavioral patterns are indicated as being anomalous.

In some embodiments, those instances of the datasets that are indicated as being anomalous are sent to a user agent 305 as a security alert or output data 161, 332. The user agent determines if the instances of the datasets that are indicated as being anomalous are actually anomalous. The user agent then sends feedback 171, 306 that correctly labels the dataset instances as anomalous or not. This is used to generate the updated initial profile 341.

The method 500 includes at one or more second machine-learning models that have been trained using a subset of the one or more datasets, training a second profile based on the one or more features to specify behavioral patterns of the received datasets that are learned by the second machine-learning model (540). For example, as previously described the machine-learning models 153, 335 learn from the extracted features 322 the actual behavioral patterns of the received datasets. These learned behavioral patterns are included in the profile in training 154, 342, and the real profile 343. Once the real profile 343, which the fully trained version of the profile in training is then used to determine anomalies in the received datasets as previously described.

Finally, because the principles described herein may be performed in the context of a computing system some introductory discussion of a computing system will be described with respect to FIG. 6. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
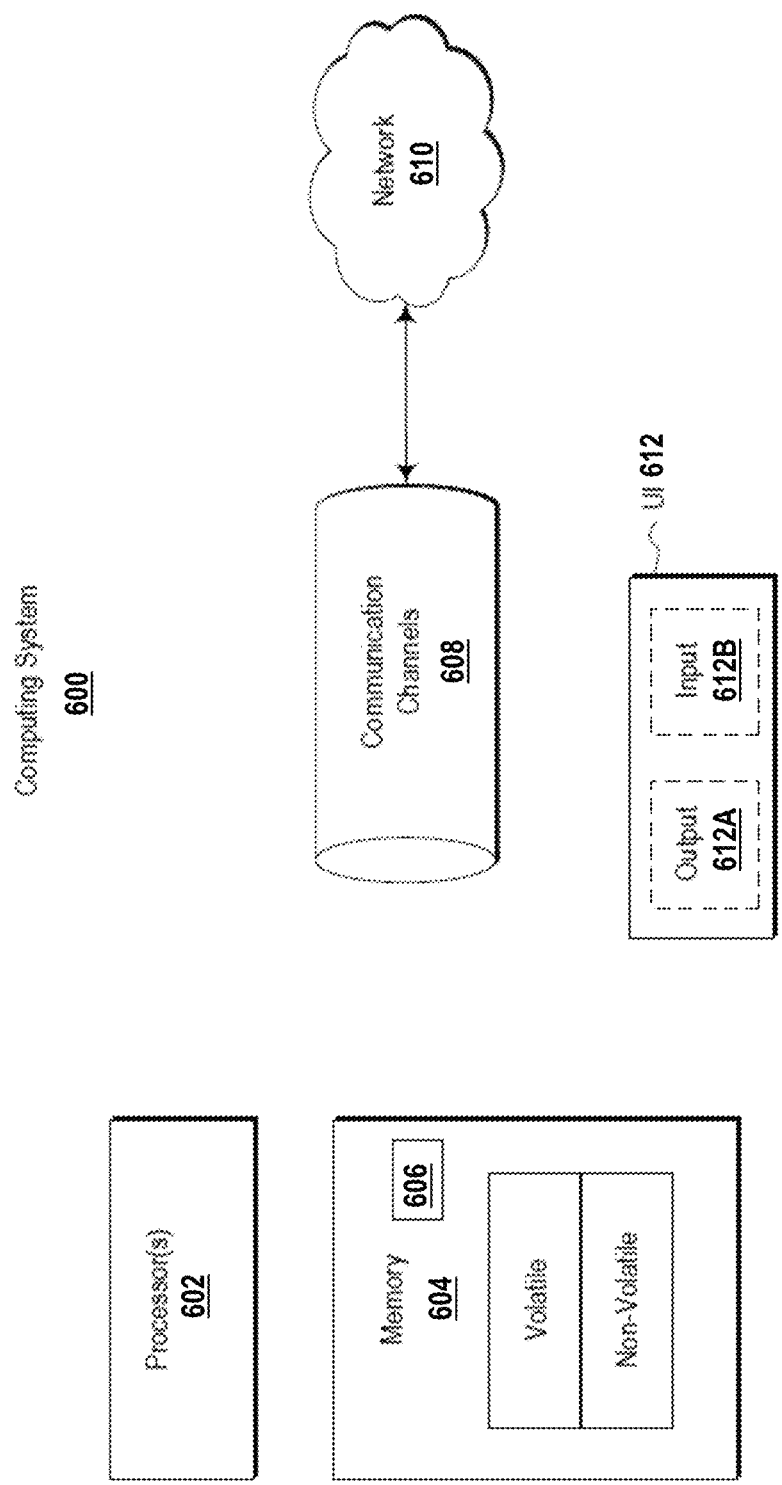
FIG. 6 illustrates an example computing system in which the embodiment described herein may be employed.

As illustrated in FIG. 6, in its most basic configuration, a computing system 600 typically includes at least one hardware processing unit 602 and memory 604. The processing unit 602 may include a general-purpose processor and may also include a field-programmable gate array (FPGA), an application-specific integrated circuit (ASIC), or any other specialized circuit. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 also has thereon multiple structures often referred to as an "executable component". For instance, memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, and so forth. Examples of input mechanisms 612B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation)

before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 600 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 602 and memory 604, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable hardware storage devices having stored thereon computer-executable instructions that are structured such that, when executed by the one or more processors, the computer-executable instructions cause the computing system to perform at least:
generate, based on input received from a user of the computing system, an initial profile that has not been trained by any databases and specifies expected behavioral patterns of datasets that are to be received by the computing system;
extract from one or more received datasets received by the computing system one or more features that are indicative of behavioral patterns of the one or more received datasets;
provide the initial profile to one or more first machine-learning models, the one or more first machine-learning models having been trained using a subset of the one or more datasets, the one or more first machine-learning models using the initial profile to determine if the behavioral patterns of the received datasets are anomalous;
at one or more second machine-learning models that have been trained using a subset of the one or more datasets, train a second profile based on the one or more features to specify behavioral patterns of the received datasets that are learned by the second machine-learning model;
determine a confidence level for the one or more second machine-learning models and the second profile; and
compare the confidence level for the one or more second machine-learning models and a corresponding confidence level for the one or more first machine-learning models,
wherein when the confidence level for the one or more second machine-learning models is greater than the corresponding confidence level for the one or more first machine-learning models, discontinue use of the one or more first machine-learning models, and use the one or more second machine-learning models.

2. The computing system of claim 1, wherein the computing system is further configured to:
provide an indication of anomalous instances of the received datasets to a user agent;
in response to receiving feedback from the user agent that specifies if the instances of the received datasets that were indicated as being anomalous were actually anomalous or not, update the initial profile to generate an updated initial profile that includes what was learned from the user feedback; and
provide the updated initial profile to the first machine-learning model for use in determining if the behavioral patterns of the received datasets are anomalous.

3. The computing system of claim 2, wherein the computing system is further configured to:
provide what was learned from the user feedback to the one or more second machine-learning models to thereby speed up the training of the second profile.

4. The computing system of claim 2, wherein a new updated initial profile is generated every time new feedback is received from the user agent.

5. The computing system of claim 1, wherein the computing system is further configured to:
use the second profile to determine if the behavioral patterns of the received datasets are anomalous.

6. The computing system of claim 1, wherein the input received from the user to generate the initial profile is one or more of (1) user described behavioral patterns from common data events, (2) behavioral patterns derived from simulations of common computing system activities, or (3) behavioral patterns derived from configuration settings of resources using the computing system.

7. The computing system of claim 1, wherein the expected behavioral patterns include one or more of a known IP list, a known application list, expected traffic thresholds, expected authentication methods, expected naming, expected activity times, a device name or identification, an account name, an organization name, a day of a week data events are likely to occur, a time of a day data events are likely to occur, a username, or a location where data events are likely to occur.

8. The computing system of claim 1, wherein the computing system is further configured to:
generate a security alert when instances of the received datasets that are indicated as being anomalous.

9. A method for a computing system to use a user generated initial profile including known behavioral patterns to detect anomalies in received data using a first machine-learning model while in parallel training a second machine-learning model to learn the behavioral patterns of the received data so that the second machine-learning model can detect the anomalies, the method comprising:
generating, based on user input received from a user of a computing system, an initial profile that has not been trained by any databases and specifies expected behavioral patterns of datasets that are to be received by the computing system;
extracting from one or more received datasets received by the computing system one or more features that are indicative of behavioral patterns of the one or more received datasets;
providing the initial profile to one or more first machine-learning models, the one or more first machine-learning models having been trained using a subset of the one or more datasets, the one or more first machine-learning models using the initial profile to determine if the behavioral patterns of the received datasets are anomalous;
at one or more second machine-learning models that have been trained using a subset of the one or more datasets, training a second profile based on the one or more features to specify behavioral patterns of the received datasets that are learned by the second machine-learning model;
determining a confidence level for the one or more second machine-learning models and the second profile; and
comparing the confidence level for the one or more second machine-learning models and a corresponding confidence level for the one or more first machine-learning models,
wherein when the confidence level for the one or more second machine-learning models is greater than the corresponding confidence level for the one or more first machine-learning models, discontinue use of the one or more first machine-learning models, and use the one or more second machine-learning models.

10. The method of claim 9, further comprising:
providing an indication of anomalous instances of the received datasets to a user agent;
in response to receiving feedback from the user agent that specifies if the instances of the received datasets that were indicated as being anomalous were actually anomalous or not, updating the initial profile to generate an updated initial profile that includes what was learned from the user feedback; and
providing the updated initial profile to the first machine-learning model for use in determining if the behavioral patterns of the received datasets are anomalous.

11. The method of claim 10, further comprising:
providing what was learned from the user feedback to the one or more second machine-learning models to thereby speed up the training of the second profile.

12. The method of claim 10, wherein a new updated initial profile is generated every time new feedback is received from the user agent.

13. The method of claim 9, further comprising:
using the second profile to determine if the behavioral patterns of the received datasets are anomalous.

14. The method of claim 9, wherein the input received from the user to generate the initial profile is one or more of (1) user described behavioral patterns from common data events, (2) behavioral patterns derived from simulations of common computing system activities, or (3) behavioral patterns derived from configuration settings of resources using the computing system.

15. The method of claim 9, wherein the expected behavioral patterns include one or more of a known IP list, a known application list, expected traffic thresholds, expected authentication methods, expected naming, expected activity times, a device name or identification, an account name, an organization name, a day of a week data events are likely to occur, a time of a day data events are likely to occur, a username, or a location where data events are likely to occur.

16. The method of claim 9, further comprising:
generating a security alert when instances of the received datasets that are indicated as being anomalous.

17. A computer program product comprising one or more computer-readable storage media having thereon computer-executable instructions that are structured such that, when executed by one or more processors of a computing system, cause the computing system to perform:
generating, based on user input received from a user of the computing system, an initial profile that has not been trained by any databases and specifies expected behavioral patterns of datasets that are to be received by the computing system;
extracting from one or more received datasets received by the computing system one or more features that are indicative of behavioral patterns of the one or more received datasets;
providing the initial profile to one or more first machine-learning models, the one or more first machine-learning models having been trained using a subset of the one or more datasets, the one or more first machine-learning models using the initial profile to determine if the behavioral patterns of the received datasets are anomalous;

at one or more second machine-learning models that have been trained using a subset of the one or more datasets, training a second profile based on the one or more features to specify behavioral patterns of the received datasets that are learned by the second machine-learning model;

determining a confidence level for the one or more second machine-learning models and the second profile; and comparing the confidence level for the one or more second machine-learning models and a corresponding confidence level for the one or more first machine-learning models, wherein when the confidence level for the one or more second machine-learning models is greater than the corresponding confidence level for the one or more first machine-learning models, discontinue use of the one or more first machine-learning models, and use the one or more second machine-learning models.

* * * * *